US005234205A

United States Patent [19]

Shanley

[11] Patent Number: 5,234,205

[45] Date of Patent: Aug. 10, 1993

[54] QUICK DIE CHANGE CLAMP

[76] Inventor: Stephen F. Shanley, 9088 Highland, Grosse Ile, Mich. 48138

[21] Appl. No.: 821,756

[22] Filed: Jan. 15, 1992

[51] Int. Cl.[5] .......... B23Q 3/02

[52] U.S. Cl. .......... 269/99; 269/97; 269/95; 269/101

[58] Field of Search .......... 269/95-102, 269/243, 256

[56] References Cited

U.S. PATENT DOCUMENTS

| | | | |
|---|---|---|---|
| 928,657 | 7/1909 | Howell . | |
| 1,026,475 | 5/1912 | Tarbuck . | |
| 1,033,758 | 7/1912 | Howell | 269/99 |
| 1,382,400 | 6/1921 | Ross . | |
| 1,662,173 | 3/1928 | Schneider . | |
| 2,560,525 | 7/1951 | Nyl | 269/100 |
| 2,568,952 | 9/1951 | Dailey | 269/98 |
| 3,441,264 | 4/1969 | DeGaston | 269/97 |
| 3,451,668 | 6/1969 | Robinson | 269/93 |
| 3,687,443 | 8/1972 | Anderson | 269/99 |
| 3,712,606 | 1/1973 | Cole | 269/92 |
| 4,148,470 | 4/1979 | Kolnes et al. | 269/101 |
| 4,898,370 | 2/1990 | Saito et al. | 269/91 |
| 4,912,961 | 4/1990 | Brown | 72/462 |

OTHER PUBLICATIONS

Publication: Herwo Die Changing AB, Sundstorget 5, S-252 21 Helsingborg, Sweden.

Publication: MEE Mechanical Clamp by Optima, Kabelschlepp America, W141 N9300 Fountain Blvd., Menomonee Falls, WI 53051.

Publication: MK "Power-Nut" by Optima, Kabelschlepp America, W141 N9300 Fountain Blvd., Menomonee Falls, WI 53051.

Publication: Retrofitting for Quick Die Change in America, by Gary Zunker, Chapter 4, pp. 19-45, "Setup Reduction"; Chapter 6, pp. 67-87, Case Studies, published 1991.

*Primary Examiner*—Bruce M. Kisliuk
*Assistant Examiner*—Eileen P. Morgan
*Attorney, Agent, or Firm*—Dinnin & Dunn

[57] ABSTRACT

A quick die change clamp secures a workpiece to a work surface equipped with a T-slot. The quick die change clamp includes a fastener having a threaded end and a head at an end opposite the threaded end for slidable movement in a T-slot of a work surface. The quick change clamp also includes a clamp bar adapted to engage and disengage a workpiece and a rotatable flange stem nut attached to the clamp bar for moving the clamp bar along the threaded end.

24 Claims, 2 Drawing Sheets

QUICK DIE CHANGE CLAMP

BACKGROUND OF THE INVENTION

1. Field of the Invention

The present invention relates generally to a clamping apparatus, and more particularly to, a quick die change clamp for securing a workpiece to a work surface.

2. Description of the Related Art

Generally, a stamping press is used in industry to stamp parts such as a fender for an automotive vehicle. The stamping press includes a top ram and a bottom bolster. Either one or both the ram and bolster may have at least one, preferably a plurality of slots or keyways with a generally "T" shaped configuration. Typically, a die having die shoes is placed between the ram and bolster. The die shoe is generally a planar metal plate which may include a slot that can be aligned with a slot on either the ram or bolster.

Currently, die clamps are being used to secure or clamp workpieces such as dies, die shoes, etc. to a work surface such as the ram or bolster of a stamping press. A generally accepted description of a quick die change clamp is one that can be locked down within one half (½) or one hundred eighty degrees (180°) of nut rotation after being "snugged" down on the workpiece. An example of such a quick die change clamp is known as the "MK Power-Nut" manufactured by Kabelschlepp America, W141 W9300 Fountain Blvd., Menomanee Falls, Wis. The MK Power-Nut includes a fastener or bolt having a head which slides in the "T" shaped slot in either the top ram or bottom bolster and the bolt may enter a slot of the die shoe if provided. The bolt has a power-nut which is hand screwed down so that solid contact with the surface of the die shoe is achieved. The power-nut includes an activation nut which is turned one hundred eighty degrees (180°) with a wrench to obtain a clamping force through a complex toggle system within the power-nut to clamp or secure the die shoe to either the ram or bolster.

One disadvantage of the above quick die change clamp is that the clamp is relatively complex and costly to manufacture. Another disadvantage is that this quick die change clamp sometimes requires tightening in operation due to coming loose after operation in the press. Yet another disadvantage of the above quick die change clamp is its heavy weight.

SUMMARY OF THE INVENTION

It is, therefore, one object of the present invention to provide a quick die change clamp for securing a workpiece to a work surface.

It is another object of the present invention to provide a quick die change clamp which doesn't loosen during operation after initial tightening.

It is yet another object of the present invention to provide a strong, light weight die clamp.

It is still another object of the present invention to provide a quick die change clamp which is relatively less complex and costly to manufacture.

It is a further object of the present invention to prevent a clamp bar and nut from exiting a threaded end of a fastener on a quick die change clamp.

It is a still further object of the present invention to provide a new and improved mechanical quick die change clamp.

To achieve the foregoing objects, the present invention is a quick die change clamp for securing a workpiece to a work surface equipped with a T-slot. The quick die change clamp includes a fastener having a threaded end and a head at an end opposite the threaded end for slidable movement in a T-slot of a work surface. The quick die change clamp also includes a clamp bar adapted to engage and disengage a workpiece and rotatable means attached to the clamp bar for moving the clamp bar along the threaded end. The quick die change clamp further includes pivotal means disposed between the rotatable means and clamp bar for engaging the rotatable means when the rotatable means is rotated to develop a clamping force on the workpiece and for resisting the rotatable means from rotating about the fastener after the clamping force has been developed on the workpiece.

One advantage of the present invention is that the quick die change clamp may be used to secure a workpiece such as a die shoe to a work surface such as a ram or bolster of a stamping press. Another advantage of the present invention is that the quick die change clamp remains tightened and doesn't loosen during operation after initial tightening. Yet another advantage of the present invention is that the quick die change clamp is lighter, less complex and costly to manufacture. A further advantage of the present invention is that a single unitized die clamp is provided to save time by eliminating several loose parts currently used throughout industry. A still further advantage of the present invention is that the quick die change clamp can be easily disassembled for replacement of any broken or worn parts. Yet a further advantage of the present invention is that the clamp bar and nut are prevented from exiting the threaded end of the fastener on a quick die change clamp.

Other objects, features and advantages of the present invention will be readily appreciated as the same becomes better understood after reading the following description in light of the accompanying drawings.

DESCRIPTION OF THE PREFERRED EMBODIMENT(S)

Figure 1:
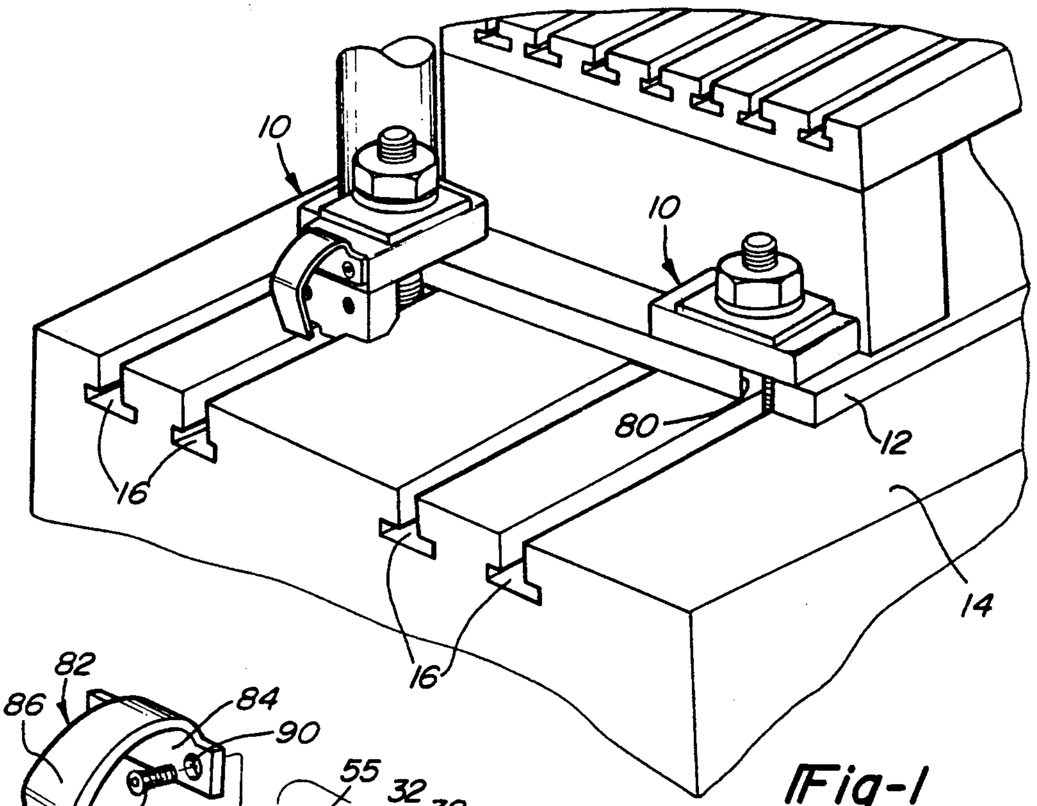
FIG. 1 is a perspective view of a quick die change clamp according to the present invention.
Figure 2:
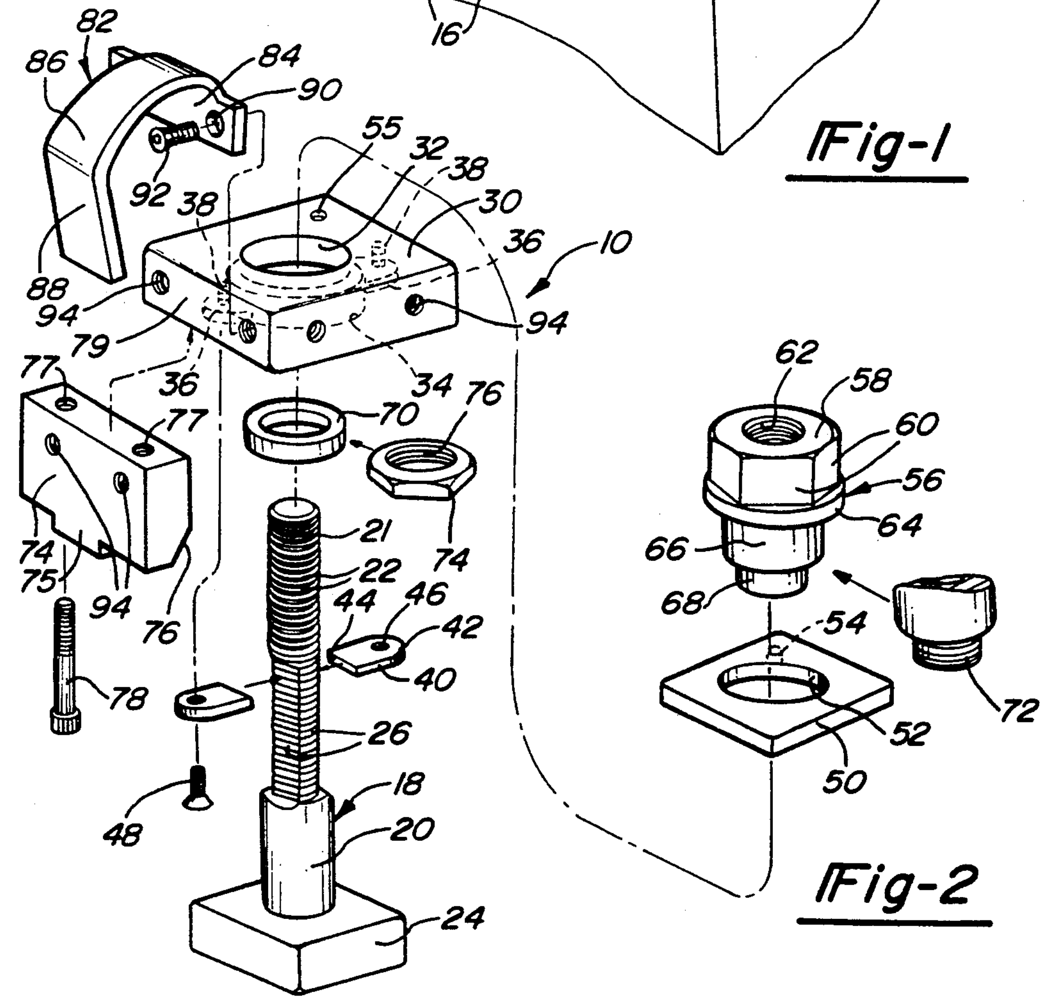
FIG. 2 is an exploded perspective view of the quick die change clamp of FIG. 1.

Referring to FIG. 1, a clamping apparatus or quick die change clamp 10 according to the present invention is shown. The quick die change clamp 10 is used to secure a workpiece 12 such as a die shoe, die, etc. to a work surface 14 such as a ram or bolster of a press. As illustrated in FIG. 1, the quick die change clamp 10 is used to secure a die shoe to the bolster of a stamping press. The work surface 14 includes at least one, preferably a plurality of, generally "T" shaped slots 16. The "T" slots 16 usually vary from 0.675 inch in width to 1.0 inch in width or longer, depending on the size of the press.

Referring to FIGS. 1 through 4, the quick die change clamp 10 includes a fastener, generally indicated at 18, such as a bolt or the like. The fastener 18 has a shaft 20 extending longitudinally with a generally circular crosssection. The shaft 20 has a threaded portion or end 21 with a plurality of threads 22. The threaded end 21 of the shaft 20 may have a diameter less than a diameter of the remainder of the shaft 20. The fastener 18 also has a head 24 at the end of the shaft 20 opposite the threaded end 21. The head 24 is generally rectangular in shape for slidable movement in the slots 16. Preferably, the head 24 is square in shape. It should be appreciated that the generally square shaped head 24 allows the quick die change clamp 10 to be used in either position as illustrated in FIG. 1.

The head 24 has a width less than a width of the slots 16 to allow the head 24 to slide in the slots 16, but has a sufficient width to prevent damage to interior corners of the slots 16 and turning of the head 24 when tightening the stem nut 56 to be described. For example, a conventional one inch fastener 18 may have a shaft 20 with a one inch diameter and a threaded end 21 necked down or reduced to a diameter of 0.875 inches. This configuration replaces the use of conventional 0.875 inch T-slot bolts which are too narrow in head width to be fully supported in a wider one inch T-slot, thereby damaging the corners at the intersections of the T-slot opening and the top of the "T" section of the "T" slot. The shaft 20 may also have a relief portion (not shown) to provide a shaft with a diameter width to allow the head 24 to have a larger width than conventional fasteners. The shaft 20 also has a pair of guide flats 26 extending partially therealong and opposing each other for a function to be described. The guide flats 26 may extend along the threaded end 21 or, preferably, along the remainder of the shaft 20. As illustrated, the guide flats 26 are a planar surface along the threads 22 and generally equal to or greater than a minor diameter of the threaded end 21. It should be appreciated that the fastener 18 is anchored in the slot 16 by the head 24.

The quick die change clamp 10 also includes a clamp bar for movement along the fastener 18 to engage and disengage the workpiece 12. The clamp bar 30 is generally rectangular in shape and includes an aperture 32 extending therethrough. The aperture 32 is generally circular in shape and has an enlarged portion 34. The clamp bar 30 also has a pair of diametrically opposite pockets 36 adjacent the enlarged portion 34. Each pocket 36 has a threaded aperture 38 extending into the clamp bar 30. It should be appreciated that the clamp bar 30 may have any suitable shape to engage the workpiece 12. It should also be appreciated that the pocket 36 may have any suitable shape.

The quick die change clamp 10 may include a pair of guide bars 40 for retaining the clamp bar 30 to the fastener 18 and for preventing the clamp bar 30 from rotating about the threaded end 21. The guide bars 40 are generally rectangular and planar in shape. The guide bars 40 may have an arcuate edge 42 at one end and a flat or planar edge 44 at an opposite end. Each guide bar 40 includes an aperture 46 extending therethrough. The quick change clamp 10 includes suitable means such as threaded screws 48 which pass through the apertures 46 in the guide bars 40 and engage the threaded apertures 38 in the clamp bar 30 to secure the guide bars 40 in the pockets 36. The planar edge 44 is located adjacent the planar guide flat 26 to prevent the clamp bar 30 from rotating about the shaft 20 of the fastener 18. The guide bars 40 are along the guide flats 26 and may engage the remainder of the shaft 20 and/or threads 22 at each end of the guide flats 26. It should be appreciated that engagement of the guide bars 40 with the threads 22 prevents further movement of the clamp bar 30 along the threaded end 21 and prevents the clamp bar 30 from exiting the threaded end 21.

Figure 3:
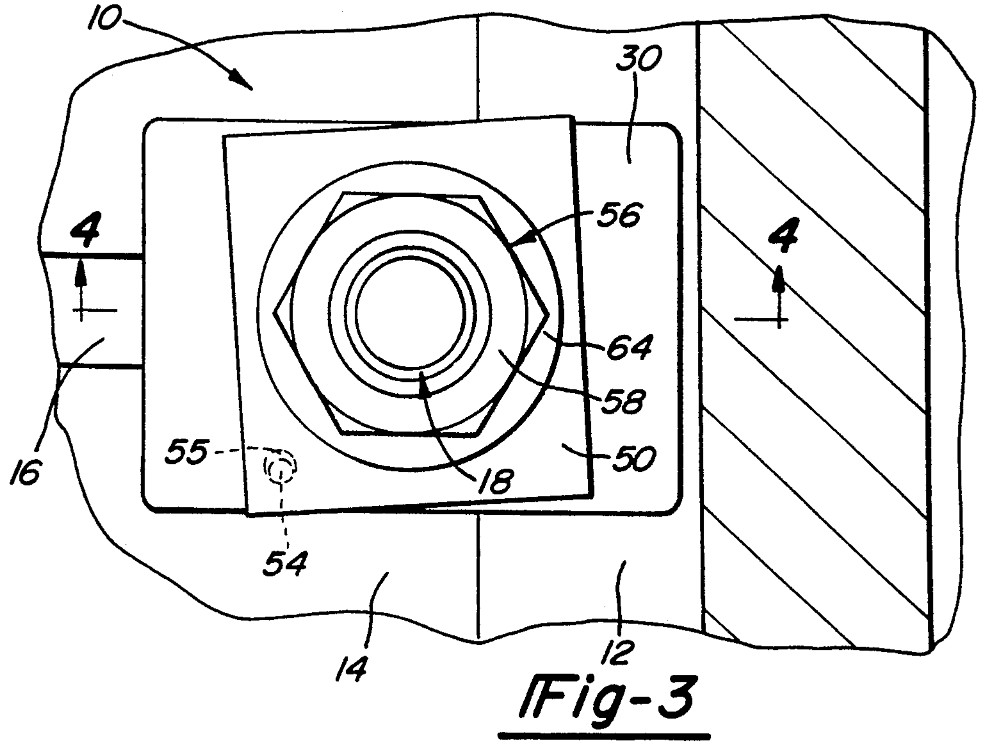
FIG. 3 is a plan view of a portion of the quick die change clamp of FIG. 1.

The quick die change clamp 10 may include a retainer plate 50 for a function to be described. The retainer plate 50 is generally rectangular in shape and includes an aperture 52 extending therethrough. The aperture 52 is generally circular in shape and has a diameter greater than a diameter of the threaded end 21 of the shaft 20. The retainer plate 50 also has a protrusion 54 extending outwardly from one surface thereof to mate with a correspondingly shaped recess 55 in a surface of the clamp bar 30. The protrusion 54 allows the retainer plate 50 to rotate relative to the clamp bar 30 about an axis of the protrusion 54 as illustrated in FIG. 3.

The quick die change clamp 10 further includes a flange stem nut, generally indicated at 56, to engage the threaded end 21 and to move the clamp bar 30 along the threaded end 21 of the fastener 18. The flange stem nut 56 includes a nut 58 which is generally cylindrical in shape and has a plurality of flats 60 to form a hexagonal shape to allow a tool to engage and rotate the nut 58. The nut 58 also has an aperture 62 extending therethrough and being threaded to engage the threaded end 21 of the shaft 20. The flange stem nut 56 also includes a flange 64 extending radially outwardly at one end of the nut 58. Preferably, the flange 64 has a diameter greater than a diameter of the aperture 52 of the retainer plate 50. The flange stem nut 56 further includes a stem 66 extending axially from the flange 64. The stem 66 has a general circular and tubular shape. The stem 66 also has an internal diameter greater than a diameter of the threaded end 21 and an external diameter less than the diameter of the aperture 52 of the retainer plate 50. The stem 66 further has a reduced portion 68 at a free end thereof. Preferably, the stem nut 56 includes a washer 70 which may be press-fitted onto the reduced portion 68 to secure the flange stem nut 56 to hold the assembly of the flange stem nut 56, clamp bar 30 and retainer plate 50 together but with clearance between the washer 70 and clamp bar 30 (approximately 0.015 inches) so that the nut 56 turns freely to move the assembly up and down along the fastener 18. Alternatively, the reduced portion 68 may have a plurality of threads 72. If so, the stem nut 56 includes a nut 74 having a threaded aperture 76 to threadably engage the threads 72 and locked thereon to secure the flange stem nut 56 with clearance in an assembly as previously described.

As illustrated in FIGS. 1 through 4, the quick die change clamp 10 may be used for securing a workpiece 12 such as an unslotted die shoe to the work surface 14. If so, the quick die change clamp 10 includes a heel block 74 which is attached to the clamp bar 30 and to engage the work surface 14. The heel block 74 has a predetermined height to allow the clamp bar 30 to remain substantially planar when engaged with the workpiece 12. The heel block 74 is generally rectangular in shape and may have a guide 75 extending outwardly at one end. The guide 75 is generally rectangular in shape and is for slidable movement in the slots 16. The heel block 74 may have an inclined surface 76 on a side to face the workpiece 12 to move the pressure center of the heel block 74 away from the center line of the fastener 18. It should be appreciated that the inclined surface 76 increases the force of the quick change clamp 10 on the workpiece 12 as compared to a conventional rectangular shaped heel block 74. The heel block 74 includes at least one, preferably a pair of apertures 77 extending therethrough. The heel block 74 is secured to the clamp bar 30 by suitable means such as threaded fasteners 78, which pass through the apertures 77 and engage threaded apertures 79 in the clamp bar 30. Although a separate heel block 74 is illustrated for a single quick die change clamp 10, it is preferred that a single heel block 74 be used to extend across the work surface 14 between a plurality of quick die change clamps 10. It should be appreciated that if the workpiece 12 is a slotted die shoe, the heel block 74 is not used. As illustrated in FIG. 1, the quick die change clamp 10 may be rotated ninety degrees (90°) and the shaft 20 is disposed in a slot 80 of the workpiece 12 such that the clamp bar 30 fully contacts the workpiece 12.

Optionally, the quick die change clamp 10 may include a handle, generally indicated at 82, to allow the quick die change clamps 10 to be grasped and moved easily by an operator. The handle 82 includes an attachment portion 84 being a generally planar plate and a handle portion 86 being generally arcuate and extending outwardly from the attachment portion 84. The handle 82 may also include a counterweight portion 88 extending inwardly from the handle portion 86. The counterweight portion 88 is used to counter the weight of the quick change clamp 10 in either position, e.g., upside down for the ram or rightside up for the bolster. The attachment portion 84 includes at least one, preferably a plurality of apertures 90. The handle 82 includes threaded screws 92 which extend through the apertures 90 and engage threaded apertures 94 in either the clamp bar 30 or heel block 74. It should be appreciated that any suitable means may be used to secure the handle 82 to either the clamp bar 30 or heel block 74. It should also be appreciated that the handle 82 may extend to ride on or be disposed in the slots 16 and act as a counter torque to the stem nut 56.

To assemble the quick die change clamp 10, preferably, the retainer plate 50 is disposed on the clamp bar 30 such that the protrusion 54 is disposed in the recess 55 and the aperture 52 is aligned with the aperture 32. The stem nut 56 is disposed in the apertures 5 and 32 such that the flange 64 rests against the retainer plate 50 and the stem 66 extends through the apertures 52 and 32. Preferably, the washer 70 is press-fit onto the reduced portion 68 of the stem nut 56. In this manner, the stem nut 56, retainer plate 50, clamp bar 30 and washer 70 are a single integrated unit or assembly such that the retainer plate 50 may freely pivot and the stem nut 56 may freely rotate.

Next, the shaft 20 is extended through the stem 66 such that the threads 22 of the threaded end 21 engage the threaded aperture 62 of the nut 58. The nut 58 is rotated and moved axially along the threaded end 21 such that the enlarged portion 34 of clamp bar 30 is located along the guide flats 26. The guide bars 40 are disposed in the pockets 36 such that the planar edge 44 is adjacent the guide flat 26. The screws 48 are extended through the apertures 46 and threadably engage the apertures 38. As a result, the clamp bar 30 is resisted from rotating due to engagement between the guide plates 40 and the guide flats 26 and the clamp bar 30 is resisted from disengaging the threaded end 21 due to engagement with either the threads 22 or the remaining portion of the shaft 20 at each end of the guide flats 26.

Figure 4:
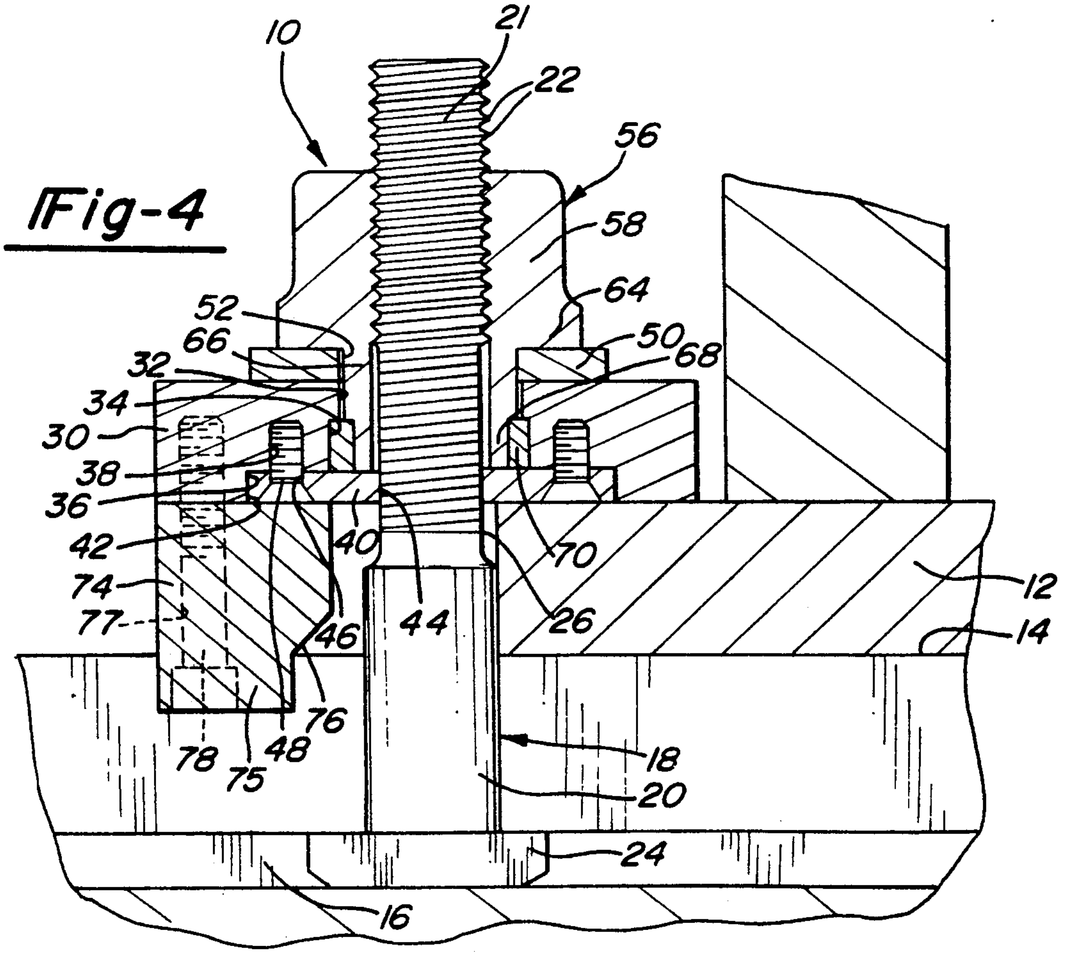
FIG. 4 is a sectional view taken along line 4—4 of FIG. 3.

In operation, the head 24 of the fastener 18 is disposed in a slot 16 of the work surface 14. The quick die change clamp 10 is moved until the clamp bar 30 is partially disposed over the workpiece 12. The nut 58 is rotated to move the clamp bar 30 toward the work surface 14 such that the clamp bar 30 engages or snugs down on the workpiece 12. At that point, the nut 58 is rotated further such as one hundred eighty degrees (180°), preferably with a tool such as a wrench, to develop a desired clamping force on the workpiece 12. As the clamping force develops on the workpiece 12, the retainer plate 50 pivots such that the surface forming the aperture 52 engages the outer surface of the stem 66 to develop a friction therebetween as illustrated in FIGS. 3 and 4. When the desired clamping force is achieved, the frictional engagement between the retainer plate 50 and stem 66 prevents or resists the stem nut 56 from loosening during operation and retains the clamping force on the workpiece 12.

To remove, the nut 58 is rotated in the opposite direction. This causes the retainer plate 50 to pivot to disengage the stem 66 of the stem nut 56. The nut 58 is rotated further to move along the threaded end 21 and away from the work surface 14 such that the clamp bar 30 disengages the workpiece 12. It should be appreciated that to release the clamp 10, the flange stem nut 56 is turned slightly to just clear the workpiece 12 or just enough to remove the clamp 10 and re-insert, e.g., quick die change clamp.

The quick die change clamp 10 combines the fastener 18, retainer plate 50, clamp bar 30 and stem nut 56 into a single combined unit or assembly to thereby save time in clamping the workpiece 12 to the work surface 14 by eliminating the handling of various bars, loose washers, etc. attached to the fastener. The quick die change clamp 10 also prevents loose washers and nuts from being left in the operating area of the press which can cause damage to the dies during operation of the press. The quick die change clamp 10 provides a single, easily manipulated device, wherein the fastener 18, clamp bar 30 and stem nut 56 remain attached to one another during clamping, unclamping and storage of the quick die change clamp 10.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A quick die change clamp for securing a workpiece to a work surface equipped with a T-slot, said quick die change clamp comprising:

- a fastener having a longitudinal axis, said fastener having a threaded end and a head at an end opposite said threaded end for slidable movement in a T-slot of a work surface;
- a clamp bar for engaging and disengaging a workpiece;
- rotatable means attached to said clamp bar for moving said clamp bar along said threaded end; and
- pivotal means disposed between said rotatable means and said clamp bar and rotatable about a second axis substantially parallel the longitudinal axis of said fastener for engaging said rotatable means when said rotatable means is rotated to develop a clamping force on the workpiece and for resisting said rotatable means from rotating about said fastener after the clamping force has been developed on the workpiece.

2. A quick die change clamp as set forth in claim 1 wherein said rotatable means comprises a stem nut attached to said clamp bar and including an aperture extending axially therethrough, said aperture being at least partially threaded to engage said threaded end of said fastener.

3. A quick die change clamp as set forth in claim 2 wherein said stem nut comprises a nut having said threaded aperture and a tubular stem attached to and extending axially from said nut.

4. A quick die change clamp as set forth in claim 3 wherein said stem nut includes a flange attached to said nut and extending radially outwardly.

5. A quick die change clamp as set forth in claim 4 including means for attaching said stem nut to said clamp bar.

6. A quick die change clamp as set forth in claim 1 wherein said pivotal means comprises a retainer plate including an aperture extending therethrough, said rotatable means extending through said aperture, said retainer plate including a protrusion disposed in a corresponding recess of said clamp bar to allow pivotal movement therebetween.

7. A quick die change clamp as set forth in claim 1 including first means for preventing said clamp bar from disengaging said fastener.

8. A quick die change clamp as set forth in claim 7 wherein said first means comprises two guide flats along said threads between a free end of said threaded end and said head, said guide flats being substantially parallel to each other.

9. A quick die change clamp as set forth in claim 8 wherein said clamp bar includes an aperture extending therethrough.

10. A quick die change clamp as set forth in claim 9 wherein said clamp bar includes a pair of diametrically opposite pockets adjacent said aperture.

11. A quick die change clamp as set forth in claim 10 including a plurality of guide bars said guide bars disposed in said pockets and means for securing said guide bars in said pockets.

12. A quick die change clamp as set forth in claim 8 including second means for preventing said clamp bar from rotating about said fastener.

13. A quick die change clamp as set forth in claim 11 including a planar edge on said guide bar to abut said guide flats to prevent said clamp bar from rotating about said fastener.

14. A quick die change clamp as set forth in claim 1 including first means for preventing said clamp bar from rotating about said fastener.

15. A quick die change clamp as set forth in claim 14 wherein said first means comprises a guide flat along said threads between a free end of said threaded end and said head and a planar edge on a guide bar attached to said clamp bar, to abut said guide flat to prevent said clamp bar from rotating about said fastener.

16. A quick die change clamp for securing a workpiece to a work surface equipped with a T-slot, said quick die change clamp comprising:

a fastener having a threaded end and a heat at an end opposite said threaded end for slidable movement in a T-slot of a work surface;

a clamp bar for engaging and disengaging a workpiece;

rotatable means attached to said clamp bar for moving said clamp bar along said threaded end; and means between said clamp bar and said fastener for preventing said clamp bar from disengaging said fastener and for preventing said clamp bar from rotating about said fastener.

17. A quick die change clamp as set forth in claim 16 wherein said preventing means comprises two guide flats along said threads between a free end of said threaded end and said head, said guide flats being substantially parallel to each other, and guide bars attached to said clamp bar for movement along said guide flats.

18. A quick die change clamp as set forth in claim 17 wherein said preventing means further comprises a planar edge on said guide bars, such that one planar edge of one guide bar abuts one of said guide flats to prevent said clamp bar from rotating around said fastener.

19. A quick die change clamp as set forth in claim 16 including pivotal means disposed between said rotatable means and said clamp bar for engaging said rotatable means when said rotatable means is rotated to develop a clamping force on the workpiece and for resisting said rotatable means from rotating about said fastener after the clamping force has been developed on the workpiece.

20. A quick die change clamp for securing a workpiece to a work surface equipped with a T-slot, said quick die change clamp comprising:

a fastener having a threaded end and a heat at an end opposite said threaded end for slidable movement in a T-slot of a work surface;

a clamp bar for engaging and disengaging a workpiece;

rotatable means attached to said clamp bar for moving said clamp bar along said threaded end;

pivotal means disposed between said rotatable means and said clamp bar and rotatable for engaging said rotatable means when said rotatable means is rotated to develop a clamping force on the workpiece and for resisting said rotatable means for rotating about said fastener after the clamping force has been developed on the workpiece; and means between said clamp bar and said fastener for preventing said clamp bar from disengaging said fastener and for preventing said clamp bar from rotating about said fastener.

21. A quick die change clamp as set forth in claim 20 wherein said rotatable means comprises a stem nut attached to said clamp bar and including an aperture extending axially therethrough, said aperture being at least partially threaded to engage said threaded end of said fastener, said stem nut having a nut with said threaded aperture and a tubular stem attached to said nut and a flange attached to said nut and extending radially outwardly.

22. A quick die change clamp as set forth in claim 21 wherein said pivotal means comprises a retainer plate including a retainer aperture extending therethrough, said flange being disposed adjacent said retainer plate and said stem extending through said retainer aperture, said retainer plate including a protrusion disposed in a corresponding recess of said clamp bar to allow pivotal movement to engage and disengage said stem.

23. A quick die change clamp for securing a workpiece to a work surface equipped with a T-slot, said quick die change clamp comprising:

a fastener having a threaded end, a head for slidable movement in a T-slot of a work surface, two guide flats along said threads between a free end of said threaded end and said head, said guide flats being substantially parallel to each other;

a clamp bar for engaging and disengaging a workpiece;

rotatable means attached to said clamp bar for moving said clamp bar along said threaded end;

guide bars attached to said clamp bar and having a planar edge such that one planar edge of one guide bar abuts one of said guide flats to prevent said clamp bar from rotating around said fastener and to prevent said clamp bar from exiting said fastener.

24. A quick die change clamp for securing a workpiece to a work surface equipped with a T-slot, said quick die change clamp comprising:

a fastener having a threaded end and a head at an end opposite said threaded end for slidable movement in a T-slot of a work surface;

a clamp bar for engaging and disengaging a workpiece;

rotatable means attached to said clamp bar for moving said clamp bar along said threaded end;

a retainer plate disposed between said rotatable means and said clamp bar, said retainer pate including a protrusion disposed in a corresponding recess of said clamp bar to allow pivotal movement of said retainer plate for engaging said rotatable means when said rotatable means is rotated to develop a clamping force on the workpiece and for resisting said rotatable means from rotating about said fastener after the clamping force has been developed on the workpiece.

* * * * *